United States Patent [19]

Milton

[11] Patent Number: 4,638,173
[45] Date of Patent: Jan. 20, 1987

[54] ELECTROMECHANICAL POWER SOURCE

[75] Inventor: Ronald I. Milton, Cupertino, Calif.

[73] Assignee: The United States of America as represented by the Secretary of the Navy, Washington, D.C.

[21] Appl. No.: 733,834

[22] Filed: May 14, 1985

[51] Int. Cl.⁴ ............................................. H02K 21/12
[52] U.S. Cl. ..................................... 290/52; 60/39.464
[58] Field of Search ........................... 290/52; 318/161; 60/39.464

[56] References Cited

U.S. PATENT DOCUMENTS

| | | | |
|---|---|---|---|
| 3,013,388 | 12/1961 | Loughran | 60/39.46 |
| 3,024,366 | 3/1962 | Yanagimachi | 290/52 X |
| 3,187,188 | 6/1965 | Adkins et al. | 290/52 X |
| 3,409,782 | 11/1968 | Bronicki | 290/52 X |
| 3,541,409 | 11/1970 | Storsand | 318/161 X |
| 4,033,115 | 7/1977 | Baits | 60/39.09 |
| 4,473,754 | 9/1984 | Joy | 290/52 X |
| 4,577,116 | 3/1986 | Pinson | 290/52 X |

Primary Examiner—Benjamin Dobeck
Attorney, Agent, or Firm—R. F. Beers; C. D. B. Curry; W. C. Daubenspeck

[57] ABSTRACT

Electric power for a missile during flight is provided by a solid propellant gas generator coupled through a magnetically-controlled gas flow diverter valve to drive an axial flow impulse turbine. The turbine is coupled to drive an alternator which produces ac power which is conditioned to supply all the electric power for the missile. The frequency or voltage of the alternator output is sensed and fed back to the speed control circuit where it is compared to the desired value of the chosen parameter. The speed control circuit modulates the glass flow valve to adjust the flow to the turbine to drive the turbine the required speed.

7 Claims, 6 Drawing Figures

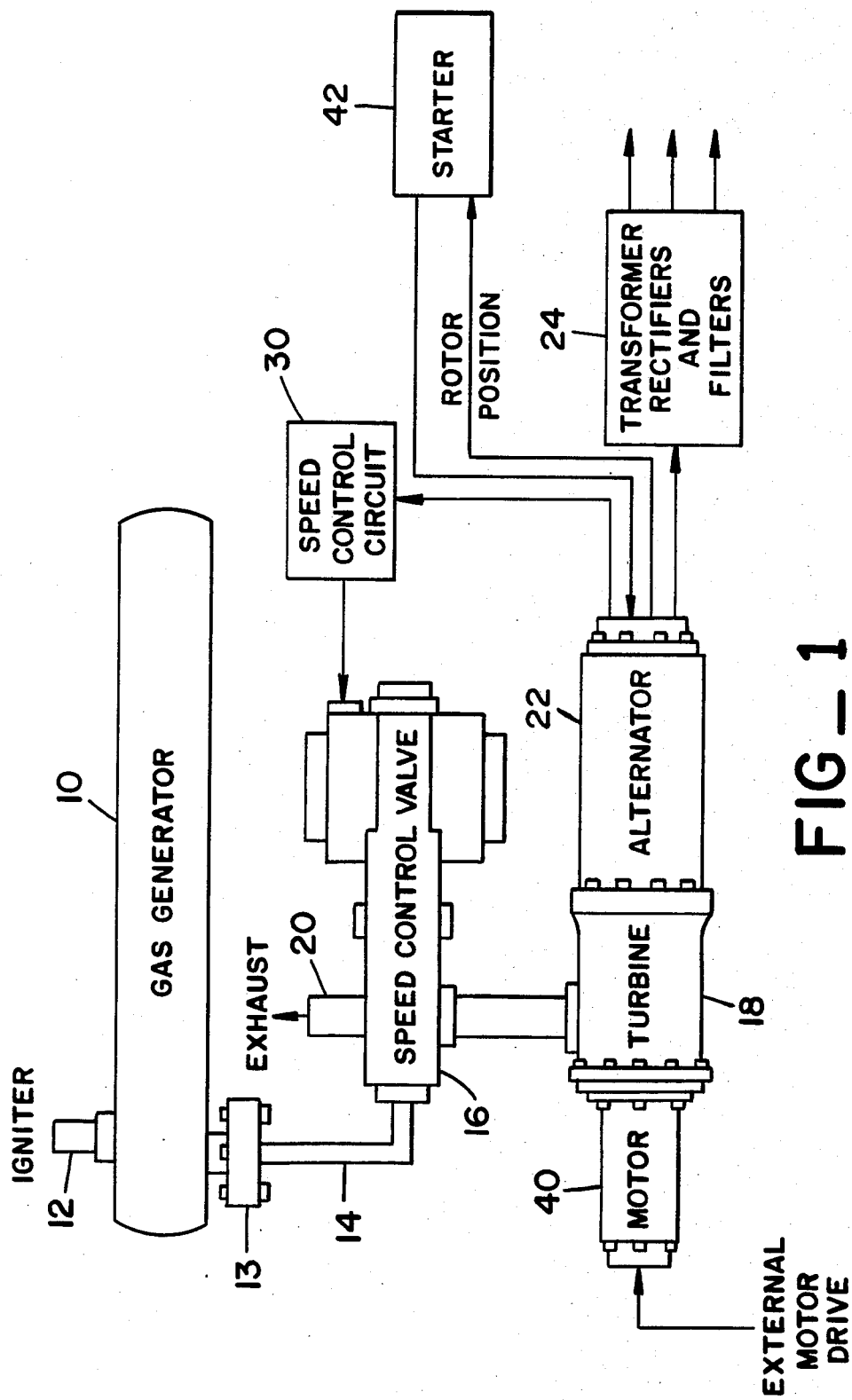
FIG_1

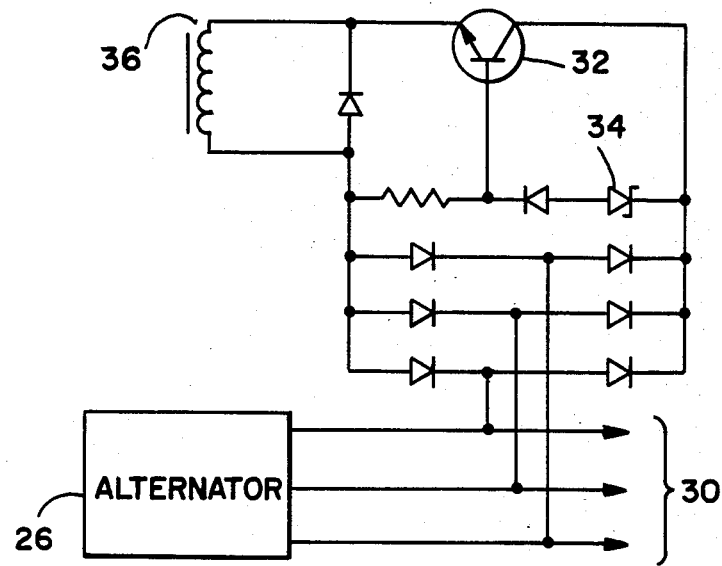
FIG _ 2a
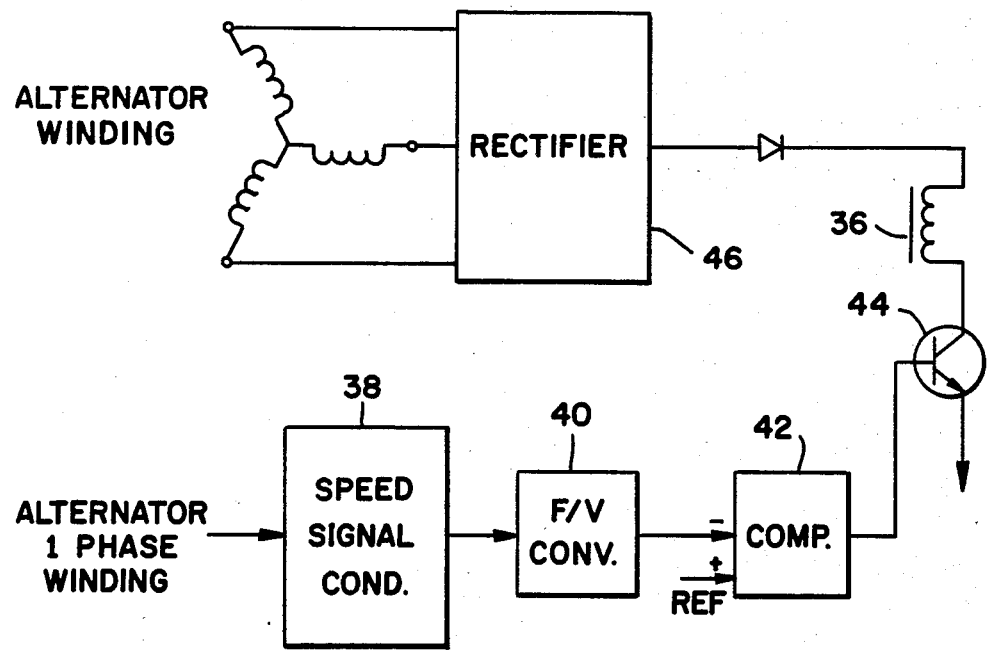
FIG _ 2b

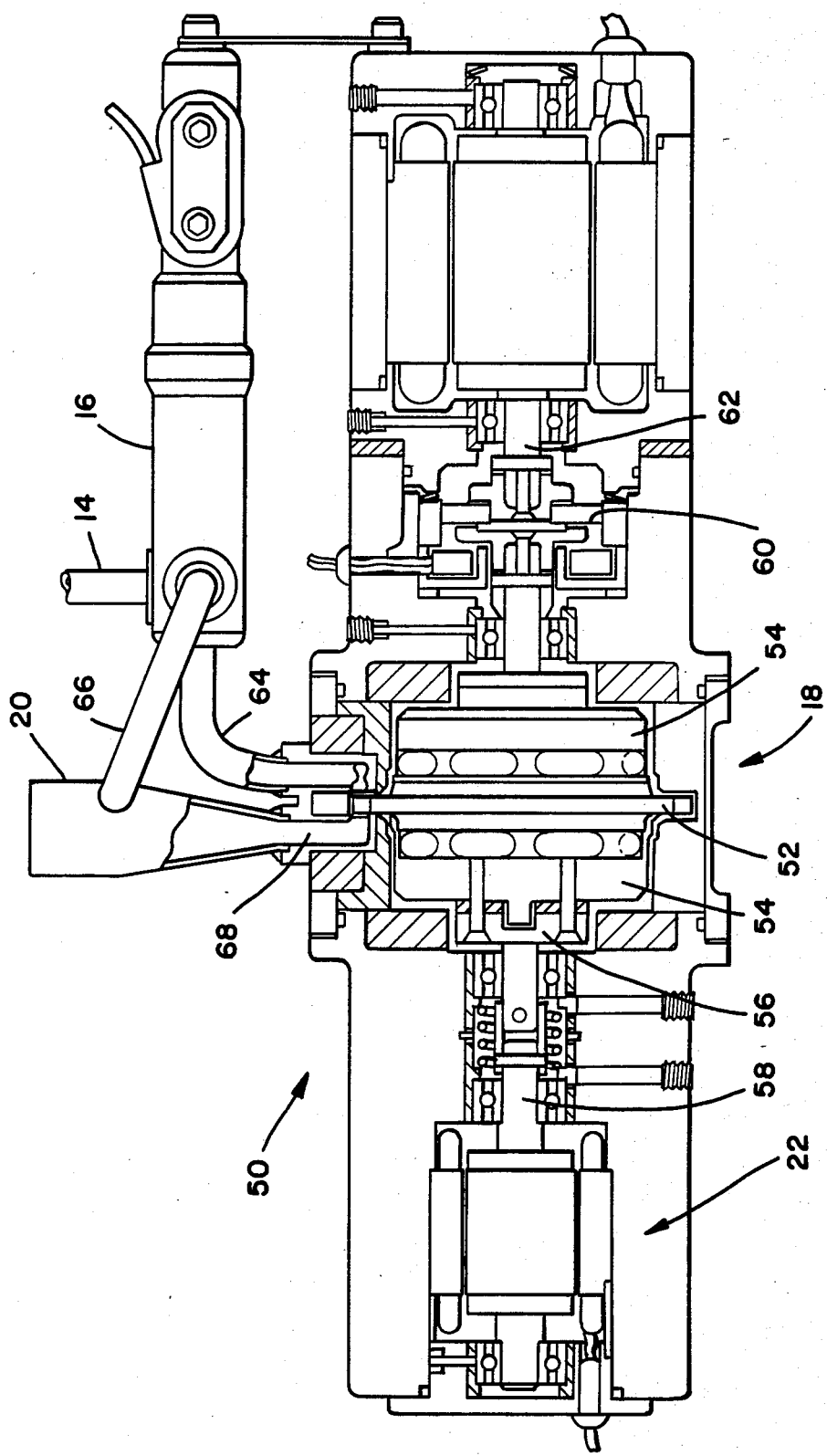
FIG_3

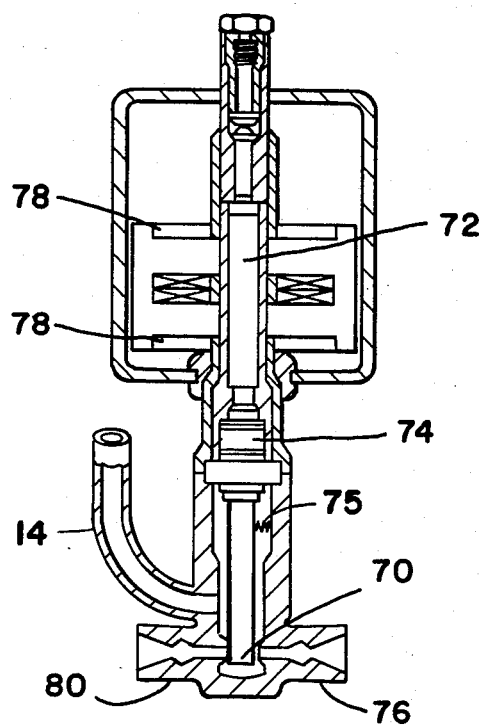
FIG_4
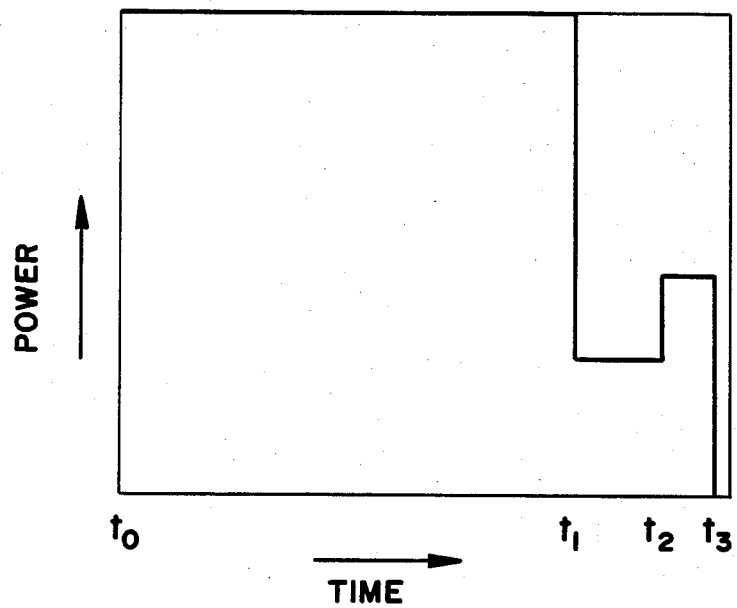
FIG_5

ELECTROMECHANICAL POWER SOURCE

BACKGROUND OF THE INVENTION

This invention relates in general to electrical power sources for aerospace vehicles and, in particular, to an electromechanical power source for supplying electrical power on missiles.

In aerospace power systems, the evolution of electrical power source design has been influenced by the availability of an existing primary power source to drive a generator. In aircraft, electrical power has normally been derived from main engine power take-off, engine compressor bleed gas, or high velocity ram air to drive an electrical generator. In missiles, no convenient primary power source exists. Because it is impractical to bleed off motor gas, and since exoatmosphere operation eliminates ram air, batteries have necessarily been used to provide the needed electrical power for guidance, flight controls and ordnance initiation on missiles.

Within limitations, batteries have been developed to meet the present missile needs for electrical power; however, missile electrical components have been compromised to be compatible with the low voltage battery. These compromises have resulted in a dc power distribution system suitable to relatively low energy output. Low voltage dc power distribution requires large conductors and connectors to carry the high current with minimum line losses and low efficiency dc to dc voltage regulators are necessary to condition power within the using electrical components. Besides using heavier components, the inefficiency of the voltage regulators requires added weight for cooling. Also, for some components such as firing units, an inverter must be added to generate ac so that the voltage can be transformed to the higher levels.

The battery on most missiles performs adequately during flight operation because battery activation before launch allows prelaunch performance to be evaluated. A performance anomaly will cause the flight to be delayed until the battery is replaced. It is this lack of readiness, the variability of storage life, and the lack of development confidence due to aging effects that have made missile batteries troublesome.

SUMMARY OF THE INVENTION

It is therefore the primary object of the present invention to provide a system for supplying primary electrical power for a missile which eliminates the need for batteries and their inherent disadvantages.

In the present invention, the electrical power for a missile during flight is provided by a solid propellant gas generator coupled through a magnetically-controlled gas flow diverter valve to drive an axial flow impulse turbine. The turbine is coupled to drive an alternator which produces ac power which is conditioned to supply all the electrical power for the missile. The frequency or voltage of the alternator output is sensed and fed back to a speed control circuit where it is compared to the desired value of the chosen parameter. The speed control circuit modulates the gas flow valve to adjust the flow to the turbine to drive the turbine to the required speed. A motoring circuit driven by an external power source accelerates the turbine to operating speed prior to activation of the gas generator. The motoring circuit maay be either an externally powered motor coupled to drive the turbine directly or a power source coupled to drive the alternator as a synchronous motor. The turbine includes a flywheel or employs a turbine wheel of sufficient mass to provide inertia during transition from externally powered motoring to gas generator operation and to damp the response to pulsed flow from the gas valve.

Other objects, features and advantages of the invention will be apparent from the following description of the preferred embodiment when considered in conjunction with the accompanying drawings.

BRIEF DESCRIPTION OF THE DRAWINGS

FIG. 1 is a schematic block diagram illustrating the electromechanical power source.

FIGS. 2a and 2b illustrate suitable speed control circuits.

FIG. 3 illustrates a turbine/alternator/motor unit.

FIG. 4 illustrates a suitable gas flow valve.

FIG. 5 shows a representative power profile for the motoring circuit during a launch sequence.

DESCRIPTION OF THE PREFERRED EMBODIMENT

Referring now to the drawings and, in particular, to FIG. 1, the electromechanical power source includes a solid propellant gas generator 10 employing a low burn rate propellant that provides a long duration burn, 1000 seconds or longer, for example, at a suitable output pressure. Gas generaors having burn rates of less than 0.025 inches per second producing suitable pressures have been demonstrated. For example, Tally of Arizona has demonstrated an ammonium nitrate oxidizer and a polyester binder. Altantic Research Corporation has demonstrated a suitable generator utilizing ammonium perchlorate oxidizer and a polyester binder.

The gas generator is ignited by a through bulkhead initiator (TBI) 12 activated by high voltage electronics not shown. The hot gas from the gas generator 10 is coupled through an outlet rupture disc 13 and a manifold 14 to a speed control valve 16. The speed control valve 16 is a magnetically controlled diverter valve which adjusts the flow of hot gas to an axial flow impulse turbine 18 to maintain the turbine speed at a desired value. The speed control valve 16 modulates the gas flow rate to the turbine by diverting a portion of gas flow away from the turbine through an exhaust nozzle 20. The speed control valve 16 and/or the turbine 18 are designed to present a constant load area to the gas generator 10. The speed control valve 16 may be disposed downstream of the converging-diverging input of turbine 18 so that the load area of the gas generator 10 is constant, regardless of electrical demands. If the speed control valve (diverter) 16 is upstream of the turbine input nozzle, a matching exhaust nozzle is required to provide a constant load area for the gas generator. The constant load area is required to maintain generator pressure and flow rate. If the load area were increased under conditions of low demand (i.e. increased exhaust area), gas generator pressure and flow rate would drop. The turbine's response to an increase in demand would then be limited by the relatively slow gas generator response which is too slow to meet system requirements.

The shaft of the impulse turbine 18 is coupled to drive an alternator 22 which produces three-phase power to supply primary power for the missile. The three-phase power is coupled through various transformers, rectifiers, and filters represented by block 32 to condition the alternator output for the various ac and dc power requirements for the various systems on the missile.

A speed control circuit 30 is coupled to the output of the alternator 22. The speed control circuit 30 may sense either the voltage or the frequency of the alternator output and modulate the speed control valve 16 to maintain the output frequency or voltage of the alternator at a desired value. The preferred speed control circuit operates as a bang bang controller in which dead band is minimized. If the speed is too low, the gas flow directed to the turbine 18; if the speed is too high, the gas flow directed to the exhaust 20.

There are many possible designs which are suitable for the speed control circuit 30. FIG. 2a shows a simplified speed control circuit based on maintaining the alternator output voltage at a desired value. A three phase ac output of the alternator 22 is coupled to a three phase rectifier to provide a smooth output signal. The smoothed output is then coupled to control a transistor switch 32 having a zener diode 34 in its base circuit. When the voltage at the zener 34 exceeds the desired output voltage, the control circuit energizes the coil 36 of the speed control valve 16 to direct the output of the gas generator 10 through the exhaust 20.

FIG. 2b shows a speed control circuit based on maintaining a constant alternator frequency. The frequency based speed control is preferred if large transients in voltage are expected because of the switching of high loads. A single phase winding of the alternator 22 is coupled to a conditioning circuit 38 where it is filtered and squared to provide a clean square wave to a frequency-to-voltage converter 40. The output of the frequency-to-voltage converter 40 is compared with a reference voltage corresponding to the desired frequency in a comparator 42. The output of the comparator 40 is coupled to turn on a switching transistor 44 when the alternator frequency is greater than the reference frequency. When the switching transistor is on, rectified (in rectifier 46) three-phase power from the alternator 22 is coupled to energize the coil 36 of the speed control valve 16 to direct the output of the gas generator through the exhaust 22.

Referring back to FIG. 1, the turbine shaft is also coupled to an externally driven motor 40. The motor 40 drives the turbine 18 to provide power to the missile before activation of the gas generator 10. The motor 40 is driven from an external power source, such as ship's power on a shipboard missile system, to bring the turbine 18 up to operational speed before launch without activating the gas generator 10. This motoring operation not only enables check out of various systems, but eliminates hardware replacement for a false missile alert.

Alternatively, the external motoring can be provided by driving the alternator 22 as a synchronous motor. The output of a starter winding 42 is coupled to the output of the alternator 22. Feedback of the rotor position is required for synchronization if the alternator 22 is driven at a very high RPM, such as in excess of 40k RPM.

Referring now to FIG. 3, the illustrated turbine/alternator/motor 50 unit includes a turbine 18 having turbine wheel 52. A flywheel 54 is attached to the turbine wheel. The flywheel's inertia maintains the turbine speed after the external motoring is disconnected, before launch, until the gas generator is ignited, shortly after launch. The flywheel also smoothes the turbine's response to pulsed flow from the speed control valve 16. Alternatively, the mass of turbine wheel 52 itself should be sufficient to maintain the turbine speed when power is removed and smooth the turbines response to pulsed flow.

One end of the shaft 56 of the turbine is coupled to the shaft 58 of the alternator 22 through suitable couplings and insulation means (shown crosshatched) to thermally-isolate the alternator 22 from the hot gases in the turbine 18. The other end of the turbine shaft is coupled through an electromagnetic clutch assembly 60 to the shaft 62 of the drive motor 40. The motor 40 is disconnected from the turbine 18 by the clutch assembly 60 prior to activation of the gas generator 10.

An inline speed control valve 16 directs the gas from inlet manifold 14 through a turbine input line 64 to drive the turbine wheel 52 or through a vent line 66 to the exhaust nozzle 20 which also serves as the exhaust path for the turbine through line 68.

FIG. 4 illustrates a valve suitable for use on the speed control valve 16. The valve is an electromagnetically controlled flapper valve using flapper 70 and solenoid armature 72 mounted on a centrally located flexural point 74. The flapper 70 is biased by spring 75 to direct the flow from the gas generator 10 through valve input line (not shown in FIG. 4) to a first valve output nozzle 76 which is coupled to the turbine input line 64. When the valve coils 78 are energized in response to the speed control circuit 34, the flow is directed through a second valve output nozzle 80 to the vent line 66. By using this approach, no power is drawn from the alternator unless an overspeed condition exists; thus no input power capacity need be added to the system for the control valve.

In operation, the motoring circuit is activated and the electromagnetic clutch is engaged at a time before launch sufficient to accelerate the turbine 16/alternator 22 to operational speed prior to launch. FIG. 5 shows a typical power profile needed from the motoring circuit. At time $t_0$ the motoring circuit is activated and accelerates the turbine at full power until operating speed is reached at $t_1$ where a lower power is required to maintain the turbine speed. At time $t_2$, power transfer occurs with the alternator now supplying missile power while being motored. At time $t_3$, all external power is removed at missile launch and the electromagnetic clutch is disconnected to reduce losses.

At launch the TBI initiator 12 is energized and the gas generator 10 ignited. The speed control circuit 30 controls the speed, frequency, and voltage of the turbo/alternator by modulating the gas flow rate through the speed control valve 16 to the turbine 18. The speed control circuit 30 compares the sensed alternator speed with a signal representing the desired speed. If the speed is too low, the gas flow is directed to the turbine 18; if the speed is too high, the gas flow is directed to the exhaust nozzle 20. The turbine's response to the pulsed flow is dampened by the flywheel. The power conditioning circuits 24 then transform the alternator output to provide power for all of the missile's systems.

What is claimed is:

1. An electromechanical power source for aerospace vehicles which comprises:
   (a) a solid propellant gas generator;
   (b) a turbine coupled to be driven by gas from said solid propellant gas generator;
   (c) an alternator coupled to be driven by said turbine;
   (d) means for measuring an output parameter of said alternator;

(e) gas flow control valve for controlling the gas flow between said gas generator and said turbine, said gas flow control valve being an electromagnetically controlled flapper valve having a first gas output coupled to the input of said turbine, a second gas output coupled to an exhaust means and a gas input; and (f) control means for comparing said output parameter of said alternator with the required value of said parameter, said control means being coupled to control said gas flow control valve to adjust the gas flow to drive said output parameter to the required value, said control means being coupled to control said flapper valve to couple said gas flow to said turbine when the value of said parameter is lower than the required value of said parameter and to control said flapper valve to couple said gas flow to said exhaust means when the value of said parameter is higher than the required value of said parameter.

2. Apparatus as recited in claim 1 further comprising motoring means coupled to drive said turbine to operational speed prior to ignition of said gas generator, said motoring means being driven by an external power source.

3. Apparatus as recited in claim 2 further including means for providing inertia for said turbine.

4. Apparatus as recited in claim 3 wherein said means for providing inertia includes a flywheel coupled to the turbine wheel.

5. Apparatus as recited in claim 2 further including means for disconnecting said motoring means from said turbine when said gas generator is ignited.

6. An electromechanical power source for aerospace vehicles which comprises:

(a) a solid propellant gas generator;
(b) a turbine coupled to be driven by gas from said solid propellant gas generator;
(c) an alternator coupled to be driven by said turbine;
(d) means for measuring the output frequency of said alternator;
(e) gas flow control valve for controlling the gas flow between said gas generator and said turbine, said gas flow control valve being an electromagnetically controlled flapper valve having a first gas output coupled to the input of said turbine, a second gas output coupled to an exhaust means and a gas input; and (f) control means for comparing the output frequency of said alternator with the required frequency, said control means being coupled to control said gas flow control valve to adjust the gas flow to drive said output frequency to the required value, said control means being coupled to control said flapper valve to couple said gas flow to said turbine when the value of said output frequency is lower than the required value of said output frequency and to control said flapper valve to couple said gas flow to said exhaust means when the value of said output frequency is higher than the required value of said output frequency.

7. An electromechanical power source for aerospace vehicles which comprises:

(a) a solid propellant gas generator;
(b) a turbine coupled to be driven by gas from said solid propellant gas generator;
(c) an alternator coupled to be driven by said turbine;
(d) means for measuring the output voltage of said alternator;
(e) gas flow control valve for controlling the gas flow between said gas generator and said turbine, said gas flow control valve being an electromagnetically controlled flapper valve having a first gas output coupled to the input of said turbine, a second gas output coupled to an exhaust means and a gas input, and (f) control means for comparing the output voltage of said alternator with the required voltage, said control means being coupled to control said gas flow control valve to adjust the gas flow to drive said output voltage to the required value, said control means being coupled to control said flapper valve to couple said gas flow to said turbine when the value of said output voltage is lower than the required value of said output voltage and to control said flapper valve to couple said gas flow to said exhaust means when the value of said output voltage is higher than the required value of said output voltage.

* * * * *